E. HOPKINSON.
APPARATUS FOR USE IN VULCANIZING PNEUMATIC TIRE CASINGS FOR VEHICLES.
APPLICATION FILED MAR. 12, 1919.

1,349,721. Patented Aug. 17, 1920.
3 SHEETS—SHEET 1.

Inventor
Ernest Hopkinson

E. HOPKINSON.
APPARATUS FOR USE IN VULCANIZING PNEUMATIC TIRE CASINGS FOR VEHICLES.
APPLICATION FILED MAR. 12, 1919.
1,349,721.
Patented Aug. 17, 1920.
3 SHEETS—SHEET 2.
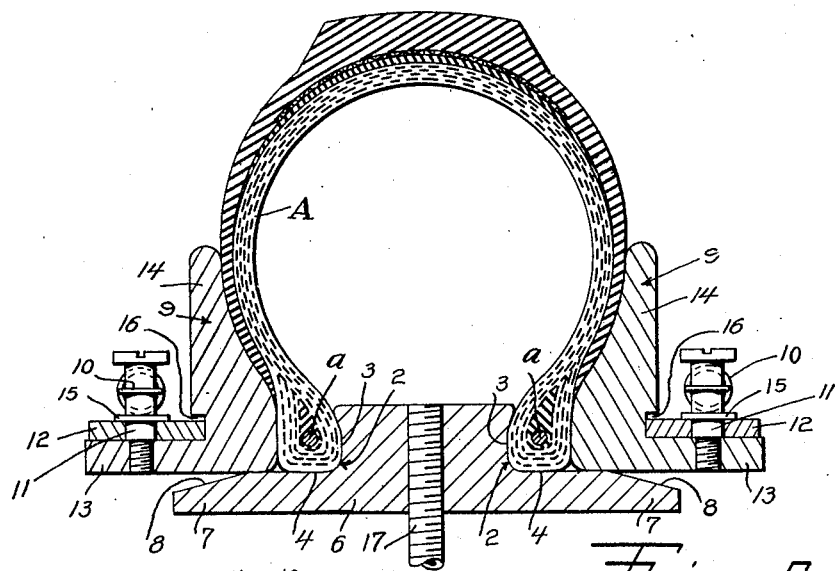
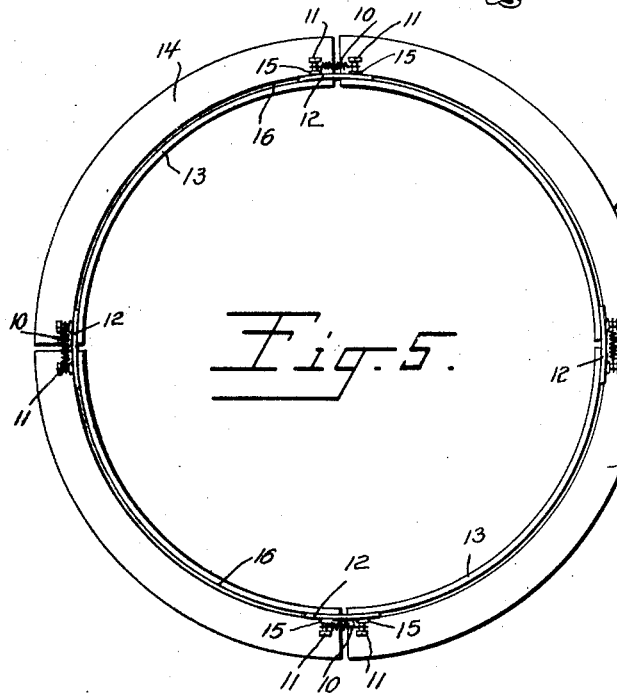
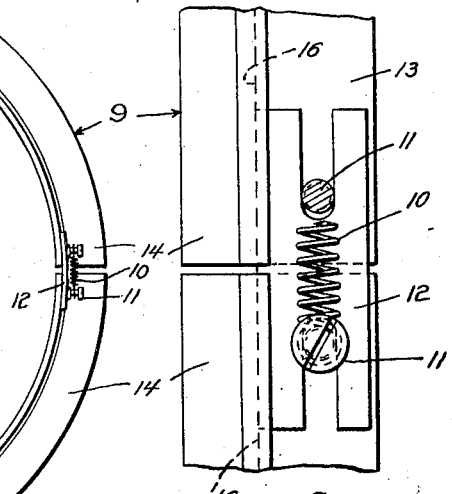
Inventor
Ernest Hopkinson

UNITED STATES PATENT OFFICE.

ERNEST HOPKINSON, OF NEW YORK, N. Y.

APPARATUS FOR USE IN VULCANIZING PNEUMATIC-TIRE CASINGS FOR VEHICLES.

1,349,721. Specification of Letters Patent. Patented Aug. 17, 1920.

Application filed March 12, 1919. Serial No. 282,097.

*To all whom it may concern:*

Be it known that I, ERNEST HOPKINSON, a citizen of the United States, residing in the city, county, and State of New York, have invented certain new and useful Improvements in Apparatus for Use in Vulcanizing Pneumatic-Tire Casings for Vehicles, of which the following is a full, clear, and exact description.

This invention relates more particularly to apparatus for use with pneumatic tire casings of the form having free edge portions or beads at the inner circumference providing an opening therebetween, and to a vulcanizing method therefor wherein is employed a fluid applied directly to the interior of the casing to support it interiorly during vulcanization.

The primary object of the invention is to provide apparatus serving both as a support, for the casing and a closure for the opening, simple and comparatively inexpensive, easily applied and removed, and requiring comparatively no adjustment or manipulation when put into operation.

Referring to the drawings forming part of this specification,

Fig. 2 is a view similar to Fig. 1 showing the casing in final position.

Fig. 5 is a bead applying ring shown in Figs. 1 and 2 viewed in a direction toward the casing, and Fig. 6 is a detailed fragmentary view of the ring showing the adjacent ends of two sections of the ring and means for securing them together.

My invention has solely to do with the U-shaped form of tire casings, that is to say the casing which has circumferential edges or beads spaced apart to provide an opening, and it is further restricted to the method of vulcanization wherein, instead of using the usual supporting core or air bag, the interior of the casing is filled with fluid under pressure in direct contact with the casing.

Figure 1:
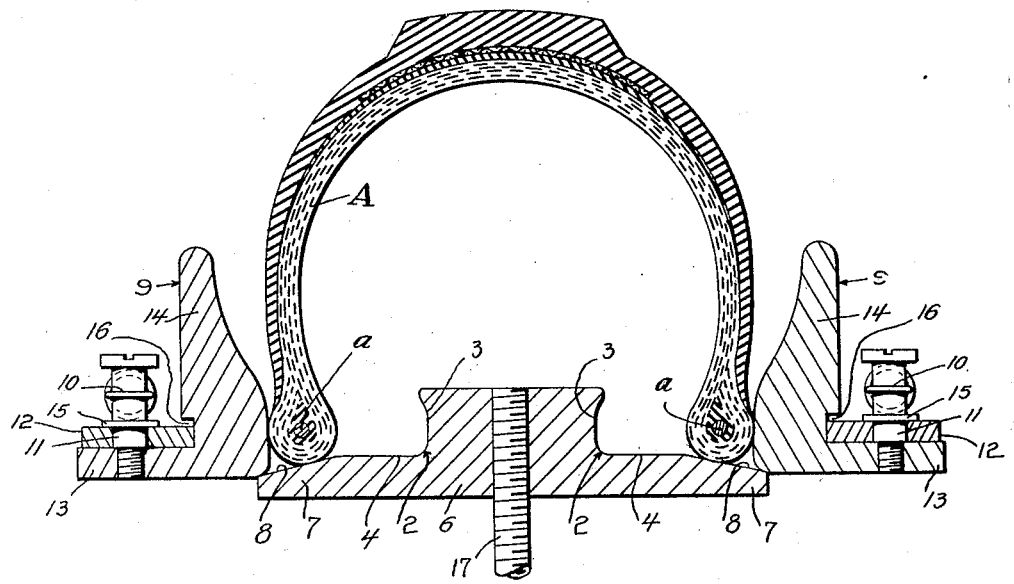
Figure 1 is a transverse sectional view of the apparatus showing the bead applying rings in process of forcing a tire casing thereupon.
Figure 3:
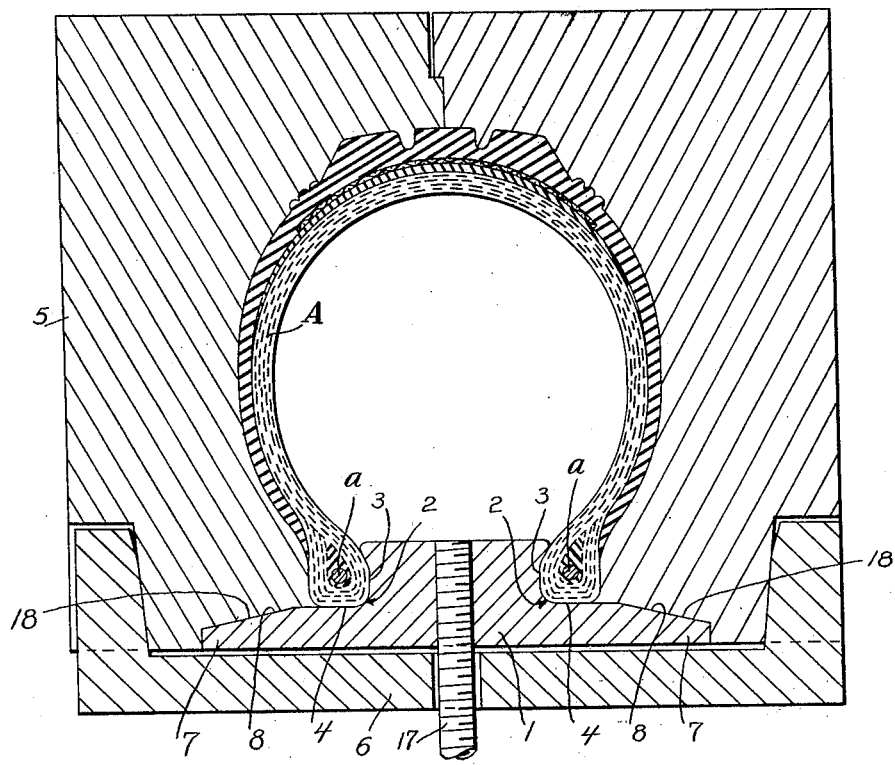
Fig. 3 is a view similar to Fig. 2 with the bead applying rings removed and the vulcanizing mold secured in place with the casing fully shaped therein ready for vulcanization.
Figure 4:
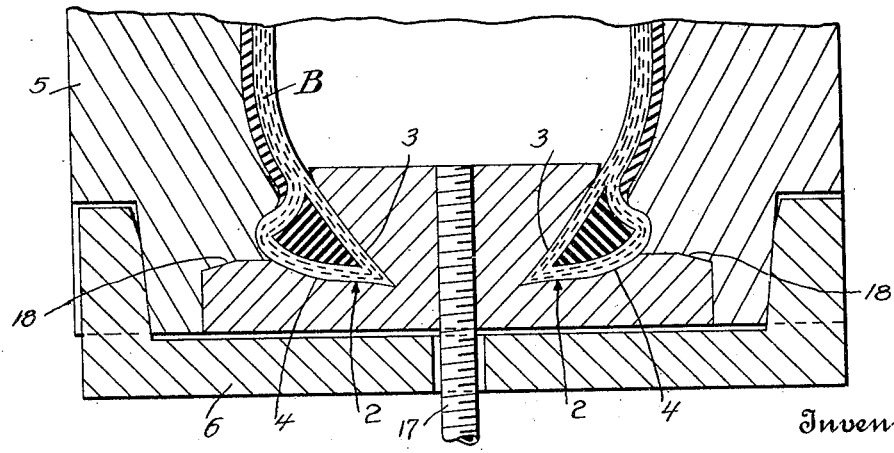
Fig. 4 is a view similar to Fig. 3 showing a different type of casing and the apparatus correspondingly shaped to accommodate the casing.

My invention is directed to providing a support for the casing and a closure for the opening and may be used with any of the various types of U-shaped casings. Figs. 1, 2 and 3 illustrate its use with a casing A of the plain-sided type, and Fig. 4 illustrates its use with a clencher type of casing B.

My invention considered broadly comprises a member spanning and extending on either side beyond the opening of the casing to form both a support and closure and provided with non-yielding walls parts of which are adapted to directly engage the inner sides of the edges or bead portions and other parts extending laterally outwardly therefrom and adapted to afford a support for the casing.

In the accompanying drawing showing an embodiment of my invention, I provide a ring 1 having its central portion serving as a closure for the opening and having oppositely disposed non-yielding walls 2—2, parts of which, as the parts 3—3 are adapted to directly engage the inner sides of the casing, and other parts 4—4 being adapted to directly engage the inner circumferences of the edges or bead portions.

The walls 4—4 are given a diameter equal to the inner diameter of the casing when finally vulcanized, and by mounting the casing upon these walls they serve as a means for supporting the casing and for accurately defining the exact inner diameter that the casing will have when finally vulcanized. The side walls 3—3 which directly engage the casing interiorly preferably terminate at or near the top of the beads and are given a shape which it is desired that the finally vulcanized casing shall assume at these portions. These walls therefore serve as a means of giving to the edges or bead portions their desired final shape, the walls being spaced apart so that their direct contact with the casing will operate to give to the bead portions the exact normal positions they will assume after vulcanization.

It is usually desirable to confine the exterior of the casing during vulcanization and if confined any of the usual means may be employed. I prefer, however, that the edges or bead portions be confined exteriorly as well as interiorly by non-yielding walls during vulcanization, and in the present instance I have shown a sectional mold 5 in general of any usual or preferred construction, which operates in the usual manner to confine not only the edges but also the entire exterior of the casing, and I have shown clamps 6 for securing the mold sections together.

I prefer to provide the apparatus with guiding portions 7—7 extending laterally beyond the walls 4—4. These assist in guiding the edges of the casing to their final positions and are especially desirable with casings of the type shown in Figs. 1 to 3 where inextensible wires $a$ are employed to confine the edges; and to provide further assistance in mounting the casing upon the support, I provide the guides with inclined surfaces 8 so that the edges of the casing may be gradually forced up the inclined surfaces to their final positions.

I prefer to construct the casing with inner circumferences slightly less than the circumferences of the walls 4—4 and then to force the edges of the casing upon the walls thereby imparting to them the increased diameter. This is comparatively easy with casings of the type shown in Fig. 4 where the edges have no confining rings and can therefore be stretched upon the supporting walls and forced into their final positions. It is not so easy with casings where inextensible wires are used such as are shown in Figs. 1 to 3, and in such instances I prefer to use an appropriate appliance to force the casing into place upon the support.

The appliance shown in the accompanying drawing, for assisting in mounting the beads upon the support is in the form of a sectional ring 9, one being used at each side of the casing. The sections are held together by tension springs 10 anchored at their ends to posts 11 secured to the sections, and plates 12 are provided to span the sections to maintain them in proper alinement. In the present instance the sections are made angular in cross-section, one side of the angle as the side 13 being cylindrical and the other side 14 projecting radially therefrom and having its inner wall preferably shaped to support the side of the casing during the forcing operation. The posts 11 are preferably secured to the sides 13 and the plates 12 seat directly upon these parts and are mounted upon the posts beneath the fixed collars 15, and are further positioned within the grooves 16 formed in the sections. The plates are mounted to provide a working fit to permit relative movement between the sections whereby the ring may be expanded and contracted.

A tube 17 passes through the ring 1 and may be provided with a check valve of any preferred or well-known structure such for instance as the valve used in inner tubes of tire casings (not shown). The tube is for the purpose of introducing the fluid within the chamber formed by the casing and ring 1 as will later more fully appear.

The tire casing may be built in any desired manner, and may be of any type and built to any desired degree of completion providing of course that it be sufficiently of the U-shaped cross-sectional configuration to permit it to be mounted on the support. In the present instance it is formed of slightly smaller size than the finished casing with its outer rubber covering applied but not given its final surface configuration. The casing in this form is mounted upon the apparatus and forced into place as shown in Figs. 3 and 4. The sections of the mold 5 are then placed in position and the clamps 6 applied. The mold sections are preferably brought together into the positions shown in Figs. 3 and 4 by placing them in a horizontal press and forcing them together by hydraulic pressure whereupon the clamps 6 are applied. Where much force is needed to mount the casing upon the support, as in the case of the type of casing shown in Figs. 1 to 3, the casing is first placed upon the ring 1 approximately in the position shown in Fig. 1. One of the rings 9 is then laid horizontally in a horizontal press. The ring 1 with the casing mounted thereon is then placed upon this ring and the companion ring 9 is then placed upon the ring 1, the several parts then assuming the positions shown in Fig. 1. The pressure of the press is then brought to bear upon the two rings 9—9 thereby forcing them up the inclined surfaces 8, the edges of the casing being forced along ahead of them until they are finally brought in contact with the walls 2, the rings 9—9 being slightly expanded during this movement. The forcing rings are then removed leaving the ring 1 with the casing mounted thereon ready to be placed within the mold.

The walls 2 coöperate with the mold walls to form mold cavities for each of the edges of the casing. The ring 1 preferably seats snugly within recesses 18 formed in the mold thereby insuring accurate centralizing of the ring 1 and providing mold cavities for the bead portions of exactly the same size and shape, so that the portions will be identical as to size and shape in the finally finished casing.

When the parts are assembled the ring 1 coöperates with the interior of the casing to form a substantially fluid-tight chamber. The fluid is finally admitted through the tube 17 into the chamber under the required pressure and the casing thereby given full tire shape, and where an outer confining mold is employed the casing is forced against the mold walls with the desired degree of pressure, the rubber covering taking any configuration formed in the walls. When the casing has been thus formed it is ready for the final vulcanization.

It will thus be seen that the apparatus above described is simple in construction, comparatively inexpensive, and being an integral structure requires no adjustment or manipulation, and is sure in operation; furthermore it provides non-yielding walls parts of which support the casing and accurately aline the edge portions thereof, and may be used to define the size and shape of the inner circumference of the casing in its finished state, and other parts of which serve to shape the inner side walls and also to give them the spaced relation they will normally assume in the finished casing; moreover where my invention makes use of the rigid outer confining walls of a mold, lateral pressure may be exerted during vulcanization and the edges thereby compressed and shaped; and by accurate centralization or definite positioning of the supporting walls relative to the mold they will coöperate with the mold walls to define definite mold cavities insuring the formation of the edges or bead portions of identical size and shape, in the finally finished casing.

Having thus described my invention what I claim and desire to protect by Letters Patent is:—

1. Apparatus for use in vulcanizing a tire casing having inner circumferential edges providing an opening therebetween, comprising a closure for the opening adapted to form with the inner wall of the casing a fluid receiving chamber, said closure having oppositely disposed non-yielding walls adapted to directly engage the inner sides of the edges, and angular extensions rigid with said walls having circumferences equal to the inner circumference of the finished casing adapted to directly engage the inner circumferences of the edges to define their size in the finished casing, and means for introducing fluid to the chamber.

2. Apparatus for use in vulcanizing a tire casing having inner circumferential edges providing an opening therebetween, comprising a closure for the opening adapted to form with the inner wall of the casing a fluid receiving chamber, said closure having oppositely disposed non-yielding walls of the shape of the final casing and adapted to directly engage and give final shape to the inner sides of the edges and integral extensions adapted to support the inner circumferences of the edges, and means for introducing fluid to the chamber.

3. Apparatus for use in vulcanizing a tire casing having inner circumferential edges providing an opening therebetween, comprising a closure for the opening adapted to form with the inner wall of the casing a fluid receiving chamber, said closure having oppositely disposed non-yielding walls for directly engaging the inner sides and extensions thereof for supporting the inner circumferences of the edges, an exterior mold coöperating with said walls to provide mold spaces for said edges, and means for introducing fluid to the chamber.

4. Apparatus for use in vulcanizing a tire casing having inner circumferential edges providing an opening therebetween, comprising a closure for the opening adapted to form with the inner wall of the casing a fluid receiving chamber, said closure having oppositely disposed non-yielding walls for directly engaging the inner sides and for supporting the inner circumferences of the edges, an exterior mold coöperating with said walls to provide mold spaces for said edges, said mold and closure having co-engaging parts for definitely positioning the closure relative to the mold, and means for introducing fluid to the chamber.

5. Apparatus for use in vulcanizing a tire casing having inner circumferential edges providing an opening therebetween, comprising a closure for the opening adapted to form with the inner wall of the casing a fluid receiving chamber, said closure having oppositely disposed non-yielding walls formed integral with the closure for engaging the inner sides and for supporting the inner circumferences of the edges, and means for introducing fluid to the chamber.

6. Apparatus for use in vulcanizing a tire casing having inner circumferential edges providing an opening therebetween, comprising a closure for the opening adapted to form with the inner wall of the casing a fluid receiving chamber, said closure having oppositely disposed non-yielding walls for engaging the edges of the casing, portions extending laterally outwardly from said walls for guiding the edges into engagement with said walls, and means for introducing fluid to the chamber.

7. Apparatus for use in vulcanizing a tire casing having inner circumferential edges providing an opening therebetween, comprising a closure for the opening adapted to form with the inner wall of the casing a fluid receiving chamber, said closure having oppositely disposed non-yielding walls for engaging the edges of the casing, portions having inclined surfaces extending laterally outwardly from said walls for guiding the edges into engagement with said walls, and means for introducing fluid to the chamber.

8. Apparatus for use in vulcanizing a tire casing having inner circumferential edges providing an opening therebetween, comprising a closure for the opening, said closure having integral portions, one of which extends radially outward and between the inner faces of the edge portions of the casing, and the other portions extending laterally underneath the edges of the casing and acting to define the size of the inner circumference of the edge portions, and means for introducing fluid into the cavity formed by the casing and said closure.

9. Apparatus for use in vulcanizing tire casings comprising a bull ring adapted to engage the inner circumferential walls of the rim engaging portions of the casing and a radial projection carried thereby adapted to directly coact with the interior side walls of said portions to form a closure for the casing, and means for supplying fluid to the casing.

10. Apparatus for use in vulcanizing tire casings comprising an integral closure adapted to directly engage in fluid tight relation the interior and circumferential walls of the rim engaging portions of the casing and to conform them to finished shape, means for maintaining said portions in contact with the closure, and means for supplying fluid to the interior of the casing.

11. Apparatus for use in vulcanizing tire casings comprising an integral closure adapted to directly engage in fluid tight relation the interior and circumferential walls of the rim engaging portions of the casing and to conform them to finished shape, a casing mold interfitted with said closure to centralize the closure with respect to the casing and maintain said portions in close engagement with the closure, and means for supplying fluid to the casing.

12. Apparatus for use in vulcanizing tire casings comprising an integral closure having walls coacting with the interior and circumferential walls of the rim engaging portions of the casing to form a fluid tight joint, means for guiding said portions to coacting position, and means for supplying fluid to the interior of the casing.

Signed at New York, New York, this 6th day of March, 1919.

ERNEST HOPKINSON.